3,251,838
OPTIONALLY SUBSTITUTED 5-METHYL-6-PHEN-
YLTETRAHYDRO-1,3,4-OXADIAZINES
Max J. Kalm, Wilmette, Ill., assignor to G. D. Searle &
Co., Chicago, Ill., a corporation of Delaware
No Drawing. Filed Aug. 15, 1962, Ser. No. 216,954
15 Claims. (Cl. 260—244)

The present invention is concerned with novel oxygen and nitrogen-containing heterocyclic organic compounds and, more particularly, with optionally substituted 5-methyl-6-phenyltetrahydro-1,3,4-oxadiazines of the structural formula

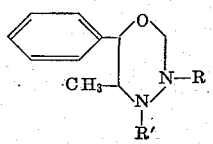

wherein R is hydrogen, a lower alkyl, or a tertiary-amino-(lower alkylene) radical, and R' is hydrogen, a lower alkyl, or aralkyl radical.

The lower alkyl radicals symbolized by the R and R' terms are, typically, methyl, ethyl, propyl, butyl, pentyl, hexyl, and the branched-chain isomers thereof. Examples of lower alkylene radicals are methylene, ethylene, trimethylene, tetramethylene, pentamethylene, and the corresponding isomeric branched-chain groups. Included in the tertiary-amino(lower alkylene) radicals represented by R are, for example, dimethylaminopropyl, diethylaminoethyl, pyrrolidinopropyl, and 4-methylpiperidinoethyl. The aralkyl radicals encompassed in the R term are exemplified by benzyl, phenethyl, 1-methylphenethyl, phenylpropyl, phenylbutyl, phenylpentyl, and the branched-chain groups isomeric therewith.

Suitable starting materials for the manufacture of the compounds of the present invention are N-substituted-β-hydroxy-α-methylphenethylamines of the structural formula

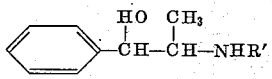

wherein R' is a lower alkyl or aralkyl radical. The latter substances are converted to the corresponding N-nitroso derivatives, typically with sodium nitrite in aqueous hydrochloric acid, and reduction of those intermediates, for example with lithium aluminum hydride in a suitable solvent, produces the N-amino compounds. The latter N-amino-hydroxy compounds are allowed to react with formaldehyde, thus providing the 1,3,4-oxadiazines of the present invention, as illustrated below

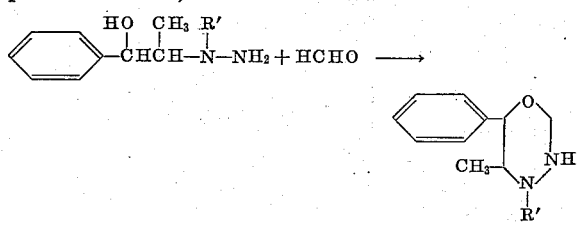

wherein R' is a lower alkyl or aralkyl radical. The latter process is conveniently conducted at room temperature using formalin (36% aqueous formaldehyde) in an aqueous medium, while other forms of formaldehyde such as meta and paraformaldehyde, used at elevated temperature, are also suitable. The aforementioned series of reactions is specifically illustrated by the nitrosation, with sodium nitrite in aqueous solution, of l-β-hydroxy-N,α-dimethylphenethylamine sulfate to yield d-β-hydroxy-N,α-dimethyl-N-nitrosophenethylamine, followed by reduction, with lithium aluminum hydride in ether, of the latter compound, resulting in d-N-amino-β-hydroxy-N,α-dimethylphenethylamine, which substance is allowed to react with 36% aqueous formaldehyde in aqueous solution to yield d-4,5-dimethyl-6-phenyltetrahydro-1,3,4-oxadiazine. By an analogous series of reactions, N-benzyl-β-hydroxy-α-methylphenethylamine is converted to 4-benzyl-5-methyl-6-phenyltetrahydro-1,3,4-oxadiazine.

The 3-substituted compounds of the present invention are obtained from the aforementioned 3-unsubstituted compounds by reaction with a suitable alkylating agent. The reaction of 4-(1-methylphenethyl)-5-methyl-6-phenyltetrahydro-1,3,4-oxadiazine, for example, in benzene with methyl iodide in the presence of sodium amide as a condensing agent, at the reflux temperature, results in 3,5-dimethyl-4-(1-methylphenethyl)-6-phenyltetrahydro-1,3,4-oxadiazine.

Hydrogenolysis of the aforementioned 4-benzyl-5-methyl-6-phenyltetrahydro-1,3,4-oxadiazine, suitably in the presence of a hydrogenation catalyst such as 5% palladium-on-carbon at 2–3 atmospheres of hydrogen pressure affords 5-methyl-6-phenyltetrahydro-1,3,4-oxadiazine. On the other hand, alkylation of 4-benzyl-5-methyl-6-phenyltetrahydro-1,3,4-oxadiazine with the aforementioned alkylating agents produces the corresponding 3-substituted compounds. Hydrogenolysis of those derivatives results in the instant 3-substituted 5-methyl-6-phenyltetrahydro-1,3,4-oxadiazine, respresented by the structural formula

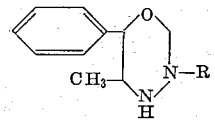

wherein R is a lower alkyl or tertiary amino(lower alkylene) radical. As a specific example, 4-benzyl-5-methyl-6-phenyltetrahydro-1,3,4-oxadiazine is allowed to react with methyl iodide in the presence of sodium amide to yield the corresponding 3-methyl derivative, which substance is hydrogenolyzed in the manner above described to afford 3,5-dimethyl-6-phenyltetrahydro-1,3,4-oxadiazine.

Equivalent to the instant amines for the purposes of this invention are the corresponding non-toxic acid and quaternary salts, exemplified by the citrate, tartrate, maleate, ascorbate, gluconate, lactate, succinate, phosphate, sulfate, hydrobromide, hydrochloride, methiodide, ethiodide, methochloride, methobromide, methosulfate, ethosulfate, etc.

The compounds of the present invention display valuable pharmacological properties. They are, for example, central nervous system-depressant, anorectic, hypocholesterolemic, and anti-inflammatory agents. In addition, they possess ulcer-inhibitory properties. They are also anti-biotic agents as is evidenced by their ability to inhibit the growth of *Diplococcus pneumoniae*, *Escherichia coli*, *Bacillus subtilis*, *Tricophyton mentagrophytes*, and *Chlorella vulgaris*, and also the ability to inhibit dicotyledenous seed formation.

The invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples, temperatures are given in degrees centigrade (° C.). Quantities of materials are expressed in parts by weight unless otherwise noted.

*Example 1*

To a solution of 131.5 parts of l-β-hydroxy-N,α-dimethylphenethylamine sulfate (l-epherdine sulfate) in 200 parts of water is added, dropwise with stirring at 75–80°, a solution of 35.2 parts of sodium nitrite in 100 parts of water over a period of about 1½ hours. This reaction mixture is stirred for 2 hours longer at 75–80°, then is cooled to room temperature and is successively extracted with benzene and ether. The combined extracts are dried over anhydrous potassium carbonate, then are stripped of solvent at reduced pressure. The residual greenish-yellow oil solidifies on standing to afford d-β-hydroxy-N,α-dimethyl-N-nitrosophenethylamine, melting at about 82–89° and characterized further by an optical rotation of +68° in methanol.

A suspension of 79 parts of lithium aluminum hydride in 2800 parts of anhydrous ether is heated at the reflux temperature with stirring for about 45 minutes, at the end of which time the heat source is removed and a solution of 202 parts of d-β-hydroxy-N,α-dimethyl-N-nitrosophenethylamine in 440 parts of benzene containing 700 parts of ether is added dropwise with stirring. After the addition is complete, the reaction mixture is heated at the reflux temperature with stirring for about 5 hours, then is cooled to 0–5° and is treated successively with 83 parts of water, 62.5 parts by volume of 20% aqueous sodium hydroxide, and 291 parts of water. The precipitated inorganic salts are removed by filtration, and the filtrate is concentrated to dryness at reduced pressure to afford a residual yellow oil. Distillation of this yellow oil at reduced pressure affords pure d-N-amino-β-hydroxy-N,α-dimethylphenethylamine, boiling at 117–118° at 0.65 mm. pressure. It is characterized further by an optical rotation in methanol, varying between +20.5° and +24.5°.

To a solution of 26.3 parts of d-N-amino-β-hydroxy-N,α-dimethylphenethylamine in 100 parts of water is added 12.8 parts by volume of 36% aqueous formaldehyde, and the resulting reaction mixture is shaken vigorously for about 15 minutes, then is extracted with ether. The ether extracts are dried over anhydrous potassium carbonate, then stripped of solvent at reduced pressure, resulting in a residual greenish oil. This oil is distilled at reduced pressure to yield colorless d-4,5-dimethyl-6-phenyltetrahydro-1,3,4-oxadiazine, boiling at 102–103% at 0.7 mm. pressure. It is characterized further by an optical rotation of +65° in chloroform, a refractive index of 1.5450 at 25°, and by the structural formula

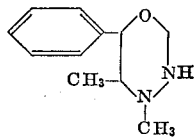

*Example 2*

To a suspension of 3.12 parts of sodium amide in 176 parts of dry benzene is added a solution of 7.68 parts of d-4,5-dimethyl-6-phenyltetrahydro-1,3,4-oxadiazine in 44 parts of dry benzene. The resulting reaction mixture is heated with stirring at the reflux temperature for about 30 minutes at the end of which time the heat source is removed, and a solution of 8.51 parts of methyl iodide in 44 parts of dry benzene is added dropwise over a period of about 10 minutes. An exothermic reaction occurs during the addition and a precipitate forms toward the end of that addition. Heating at the reflux temperature is continued with stirring for about 3 hours, after which time the mixture is cooled in an ice bath and diluted by the cautious addition of 75 parts of water. The benzene layer is separated and washed with water, dried over anhydrous potassium carbonate, then stripped of solvent at reduced pressure. Distillation at reduced pressure affords pure d-3,4,5-trimethyl-6-phenyltetrahydro-1,3,4-oxadiazine, boiling at 85–87° at 0.75 mm. It is characterized further by an optical rotation of +34.5° in methanol, by a refractive index of 1.5191 at 25°, and also by the structural formula.

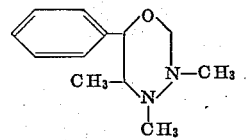

*Example 3*

The substitution of 8.14 parts of 2-diethylaminoethyl chloride in the procedure of Example 2 results in d-3-(2-diethylaminoethyl)-4,5-dimethyl-6-phenyltetrahydro-1,3,4-oxadiazine, boiling at 127–128° at 0.5 mm. pressure. It displays an optical rotation of +19° in methanol and a refractive index of 1.5053 at 25°. This substance is represented by the structural formula

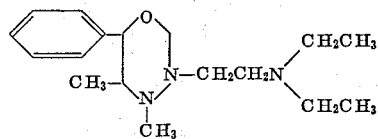

*Example 4*

By substituting 9.69 parts of 2-(4-methylpiperidino)ethyl chloride and otherwise proceeding according to the processes of Example 2, d-3-[2-(4-methylpiperidino)ethyl]-4,5-dimethyl-6-phenyltetrahydro-1,3,4-oxadiazine is obtained. It is characterized by a boiling point of 132° at 0.24 mm. pressure, by an optical rotation of +19.5° in methanol, and by a refractive index of 1.5160 at 25°. It is represented by the structural formula

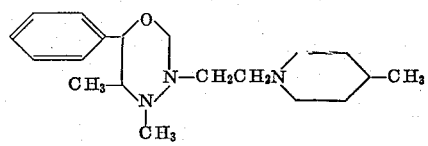

*Example 5*

By substituting 7.22 parts of n-hexyl chloride and otherwise proceeding according to the processes described in Example 2, d-3-n-hexyl-4,5-dimethyl-6-phenyltetrahydro-1,3,4-oxadiazine of the structural formula

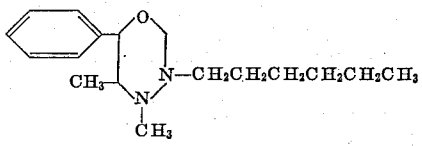

is obtained.

*Example 6*

The substitution of 7.3 parts of 3-dimethylaminopropyl chloride in the procedure of Example 3 results in d-3-(3-dimethylaminopropyl)-4,5-dimethyl-6-phenyltetrahydro-1,3,4-oxadiazine of the structural formula

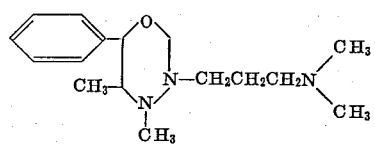

*Example 7*

By substituting 9.69 parts of 3-piperidinopropyl chloride and otherwise proceeding according to the processes of Example 4, d-3-(3-piperidinopropyl)-4,5-dimethyl-6-phenyltetrahydro-1,3,4-oxadiazine is obtained. It is represented by the structural formula

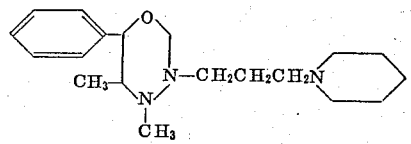

Example 8

By substituting 8.01 parts of 2-pyrrolidinoethyl chloride and otherwise proceeding according to the procedure of Example 4, d-3-(2-pyrrolidinoethyl)-4,5-dimethyl-6-phenyltetrahydro-1,3,4-oxadiazine is obtained. It is represented by the structural formula

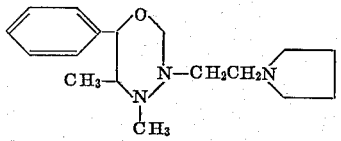

Example 9

The substitution of 9.69 parts of 2-(2-ethylpyrrolidino) ethyl chloride in the procedure of Example 4 results in d-3-[2-(2-ethylpyrrolidino)ethyl]-4,5-dimethyl-6-phenyltetrahydro-1,3,4-oxadiazine of the structural formula

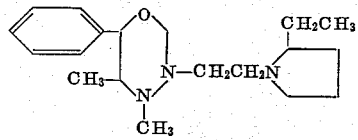

Example 10

To a suspension of 119 parts of N-benzyl-$\beta$-hydroxy-$\alpha$-methylphenethylamine (N-benzylnorephedrine) in 450 parts of water is added 49 parts of concentrated hydrochloric acid, and the resulting mixture is heated to 75° in order to effect solution. To this solution, at 75–80°, is added over a period of about 1½ hours with stirring, a solution of 34.5 parts of sodium nitrite in 100 parts of water. Stirring at 75–80° is continued for about 2 hours longer, after which time the reaction mixture is cooled and extracted with benzene. The organic layer is separated, dried over anhydrous potassium carbonate, decolorized with activated carbon and stripped of solvent at reduced pressure to afford a residual orange-colored oil. This oily product crystallizes on standing to yield N-benzyl-$\beta$-hydroxy-$\alpha$-methyl - N - nitrosophenethylamine as a low-melting solid.

A suspension of 14.07 parts of lithium aluminum hydride in 700 parts of anhydrous ether is heated at reflux for about 1¼ hours, at the end of which time a solution of 50 parts of N-benzyl-$\beta$-hydroxy-$\alpha$-methyl-N-nitrosophenethylamine in 210 parts of anhydrous ether is added dropwise over a period of about 2 hours. Heating at the reflux temperature is continued with stirring for about 5 hours, at which point the excess reagent is destroyed by the addition of 9.8 parts of ethyl acetate while the mixture is cooled in an ice bath. To this mixture is then added successively 14.8 parts of water, 11.1 parts of 20% aqueous sodium hydroxide, and 51.8 parts of water. The resulting precipitated solids are removed by filtration, and the filtrate is stripped of solvent at reduced pressure. The residual product is distilled at reduced pressure to afford N-amino-N-benzyl-$\beta$-hydroxy-$\alpha$-methylphenethylamine, boiling at 177–180° at 0.9 mm. pressure.

The latter free base is converted to the corresponding hydrochloride by dissolution in absolute ethanol followed by acidification of the resulting solution with isopropanolic hydrogen chloride and dilution of the mixture with anhydrous ether. The crystalline precipitate is recrystallized from ethanol-ether to afford N-amino-N-benzyl-$\beta$-hydroxy-$\alpha$-methylphenethylamine hydrochloride, melting at about 146–150° (dec.).

To a suspension of 19.5 parts of N-amino-N-benzyl-$\beta$-hydroxy-$\alpha$-methylphenethylamine in 60 parts of water is added 6.68 parts by volume of 36% aqueous formaldehyde, and this reaction mixture is shaken vigorously for about 10 minutes. Extraction of the mixture first with chloroform, then with ether affords an organic solution which is dried over anhydrous potassium carbonate, is then stripped of solvent and finally is distilled at reduced pressure to afford pure 4-benzyl-5-methyl-6-phenyltetrahydro-1,3,4-oxadiazine, which boils at 163–166° at 0.75 mm. pressure and is characterized further by the structural formula

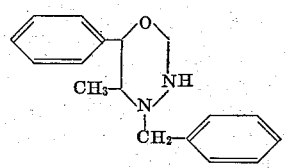

To a solution of the latter free base in absolute ethanol is added isopropanolic hydrogen chloride, and this acidic mixture is then diluted with anhydrous ether to the point of turbidity. The resulting precipitate is collected by filtration and recrystallized from ethanolether to yield crystalline 4-benzyl-5-methyl-6-phenyltetrahydro - 1,3,4-oxadiazine hydrochloride, which substance melts at about 142–144° (dec.).

Example 11

The reaction of 10.72 parts of 4-benzyl-5-methyl-6-phenyltetrahydro-1,3,4-oxadiazine with 7.22 parts of n-hexyl chloride by the procedure described in Example 2 results in 4-benzyl-3-n-hexyl-5-methyl-6-phenyltetrahydro-1,3,4-oxadiazine of the structural formula

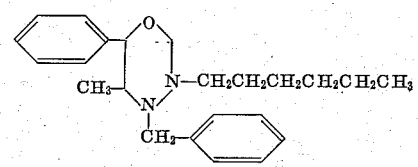

Example 12

A mixture of 217.6 parts of N-(1-methylphenethyl)-$\beta$-hydroxy-$\alpha$-methylphenethylamine (N - (1 - methylphenethyl)norephedrine), 80.5 parts of concentrated hydrochloric acid, 480 parts of absolute ethanol, and 200 parts of water is heated to 75° to effect solution, at which time a solution of 57.4 parts of sodium nitrite in 150 parts of water is added over a period of about 70 minutes. The resulting reaction mixture is heated at 75–80° with stirring for about 2½ hours longer, then is cooled to room temperature. The aqueous layer is removed by decantation and the residual oil is extracted into benzene. Further dilution of the aqueous phase with water, and extraction with benzene affords an organic solution which is combined with the original extract, then is washed with water, and dried over anhydrous potassium carbonate. Distillation of the solvent at reduced pressure affords a viscous yellow oil, which is N-(1-methylphenethyl)-$\beta$-hydroxy-$\alpha$-methyl-N-nitrosophenethylamine.

To a suspension of 59.2 parts of lithium aluminum hydride in 1750 parts of anhydrous ether, heated at the reflux temperature for about one hour, is added over a period of about 2 hours, a solution of 232.3 parts of N - (1 - methylphenethyl) - $\beta$ - hydroxy - $\alpha$ - methyl-N-nitrosophenethylamine in 220 parts of benzene containing 350 parts of ether. This mixture is heated at the reflux tempertaure with stirring for about 5 hours longer, is then stored at room temperature for about 16 hours, and is finally heated at reflux for an additional 4 hours. The excess reagent is destroyed by the addition, at ice-bath temperature, of 45 parts of ethyl acetate. To that mixture is then added successively 62.5 parts of water, 46.8 parts of 20% aqueous sodium hydroxide, and 218 parts of water. Stirring is continued at room temperature for about one hour, after which time the mixture is filtered. Distillation of the solvent from the filtrate at reduced pressure affords a residual yellow oil which solidifies on standing. Recrystallization from hexane affords pure N - amino - N - (1 - methylphenethyl) - $\beta$ - hydroxy-$\alpha$-methylphenethylamine.

To a suspension of 205.9 parts of N-amino-N-(1-methylphenemethyl) - β - hydroxy - α - methylphenethylamine in 1000 parts of water is added 64 parts of 36% aqueous formaldehyde, and the resulting reaction mixture is stirred at room temperature for about 2 hours. This mixture is then stirred with a large volume of chloroform, and the organic layer is separated. The aqueous layer is extracted with chloroform, and the chloroform extracts are combined, dried over anhydrous potassium carbonate, and stripped of solvent at reduced pressure to afford 4 - (1 - methylphenethyl) - 5 - methyl - 6 - phenyltetrahydro-1,3,4-oxadiazine as an orange oil.

To a solution of the latter free base in anhydrous ether is added isopropanolic hydrogen chloride until the mixture is slightly acidic. The solvent is decanted from the precipitated oil, which is recrystalized from absolute ethanol-anhydrous ether to afford white needles of 4-(1-methylphenethyl) - 5 - methyl - 6 - phenyltetrahydro-1,3,4-oxadiazine hydrochloride, melting at about 196.5–197.5°. It is represented by the structural formula

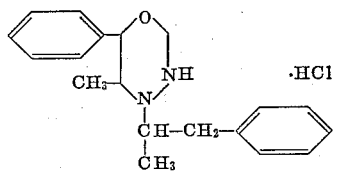

Example 13

A suspension of 6.48 parts of 4-(1-methylphenethyl)-5-methyl-6-phenyltetrahydro-1,3,4 - oxadiazine hydrochloride in water is made alkaline by the addition of 6 N aqueous sodium hydroxide, and the free base which separates is extracted into ether. The ether extract is dried over anhydrous potassium carbonate, then is stripped of solvent at reduced pressure, and the residual colorless oil is dissolved in about 88 parts of benzene. This benzene solution is concentrated to about ½ volume in order to remove the moisture, then is added to a suspension of 1.52 parts of sodium amide in 176 parts of dry benzene. This reaction mixture is heated at the reflux temperature, with stirring, for about 30 minutes, at the end of which time the heat source is removed and a solution of 4.16 parts of methyl iodide in 44 parts of dry benzene is added dropwise. Heating at the reflux temperature with stirring is continued for about 3 hours longer, after which time the mixture is cooled in an ice bath and is diluted with about 75 parts of water. The aqueous phase is separated and extracted with benzene, and the combined benzene extracts are dried over anhydrous potassium carbonate, then are stripped of solvent at reduced pressure to afford, as an oil, 4-(1-methylphenethyl)-3,5-dimethyl-6-phenyltetrahydro-1,3,4-oxadiazine.

A solution of the latter free base in absolute ethanol is made acidic by the addition of isopropanolic hydrogen chloride, and the product is precipitated by the addition of anhydrous ether. Recrystallization from ethanol-ether affords pure 4-(1-methylphenethyl)-3,5-dimethyl-6-phenyltetrahydro-1,3,4-oxadiazine hydrochloride, melting at about 193–194.5°. This substance is represented by the structural formula

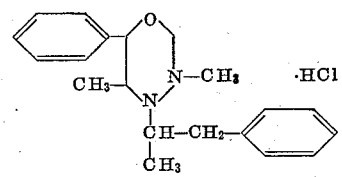

Example 14

By substituting 152.5 parts of dl-N-n-butyl-β-hydroxy-α-methylphenethylamine sulfate and otherwise proceeding according to the processes of Example 1, dl-4-n-butyl-5-methyl-6-phenyltetrahydro-1,3,4-oxadiazine of the structural formula

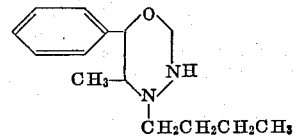

is obtained.

Example 15

The substitution of 131.5 parts of dl-β-hydroxy-N,α-dimethylphenethylamine sulfate in the procedure of Example 1 results in dl-4,5-dimethyl-6-phenyltetrahydro-1,3,4-oxadiazine of the structural formula

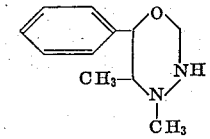

What is claimed is:
1. A compound of the formula

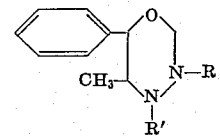

wherein R is selected from the group consisting of hydrogen and radicals of the class consisting of lower alkyl, di-(lower alkyl)amino(lower alkylene),

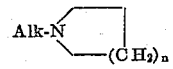

and

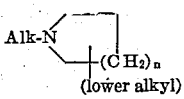

and R' is selected from the group consisting of lower alkyl and phenyl(lower alkylene).

2. d-4,5-dimethyl-6-phenyltetrahydro-1,3,4-oxadiazine.
3. d - 3,4,5 - trimethyl-6-phenyltetrahydro-1,3,4-oxadiazine.
4. d - 3 - (2-diethylaminoethyl)-4,5-dimethyl-6-phenyltetrahydro-1,3,4-oxadiazine.
5. d - 3 - [2-(4-methylpiperidino)ethyl]-4,5-dimethyl-6-phenyltetrahydro-1,3,4-oxadiazine.
6. A compound of the formula

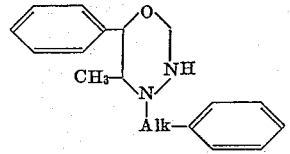

wherein Alk is lower alkylene.
7. 4 - (1 - methylphenethyl)-5-methyl-6-phenyltetrahydro-1,3,4-oxadiazine.
8. 4 - benzyl-5-methyl-6-phenyltetrahydro-1,3,4-oxadiazine.
9. A compound of the formula

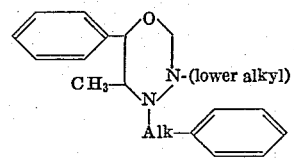

wherein Alk is lower alkylene.
10. 3,5 - dimethyl - 4-(1-methylphenethyl)-6-phenyltetrahydro-1,3,4-oxadiazine.

11. A compound of the formula

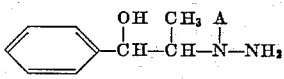

wherein A is selected from the group consisting of lower alkyl and phenyl(lower alkylene).

12. d-N-amino - β - hydroxy - N,α - dimethylphenethylamine.

13. N - amino-N-benzyl-β-hydroxy-α-methylphenethylamine.

14. N - benzyl - β-hydroxy-α-methyl-N-nitrosophenethylamine.

15. In a process for the preparation of a compound of the formula

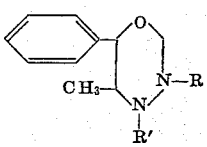

wherein R is selected from the group consisting of hydrogen and radicals of the class consisting of lower alkyl, di-(lower alkyl)amino(lower alkylene),

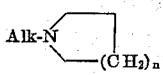

and

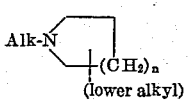

and R' is selected from the group consisting of lower alkyl and phenyl(lower alkylene), the step which comprises contacting a compound of the formula

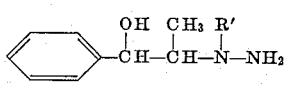

wherein R' is selected from the group consisting of lower alkyl and phenyl(lower alkylene), with formaldehyde.

References Cited by the Examiner

UNITED STATES PATENTS

| | | | |
|---|---|---|---|
| 2,953,570 | 9/1960 | Rudner | 260—569 |
| 2,957,873 | 10/1960 | Rudner | 260—569 |
| 3,119,821 | 1/1964 | Trepanier | 260—244 |
| 3,122,537 | 2/1964 | Trepanier | 260—244 |
| 3,135,748 | 6/1964 | Trepanier | 260—244 |
| 3,158,618 | 11/1964 | Trepanier | 260—244 |

OTHER REFERENCES

Fieser et al.: "Organic Chemistry," 3rd Ed., pp. 237–9, Reinhold (1956).

Noller: "Chemistry of Organic Compounds," 2nd Ed., pp. 241–242 (1957) (Saunders).

JOHN D. RANDOLPH, *Acting Primary Examiner.*

IRVING MARCUS, NICHOLAS S. RIZZO, WALTER A. MODANCE, *Examiners.*